Jan. 15, 1924.  1,480,784
R. W. SCHROEDER
AUTOMATIC BY PASS AND PRIMER FOR FLOW METERS
Filed July 2, 1921
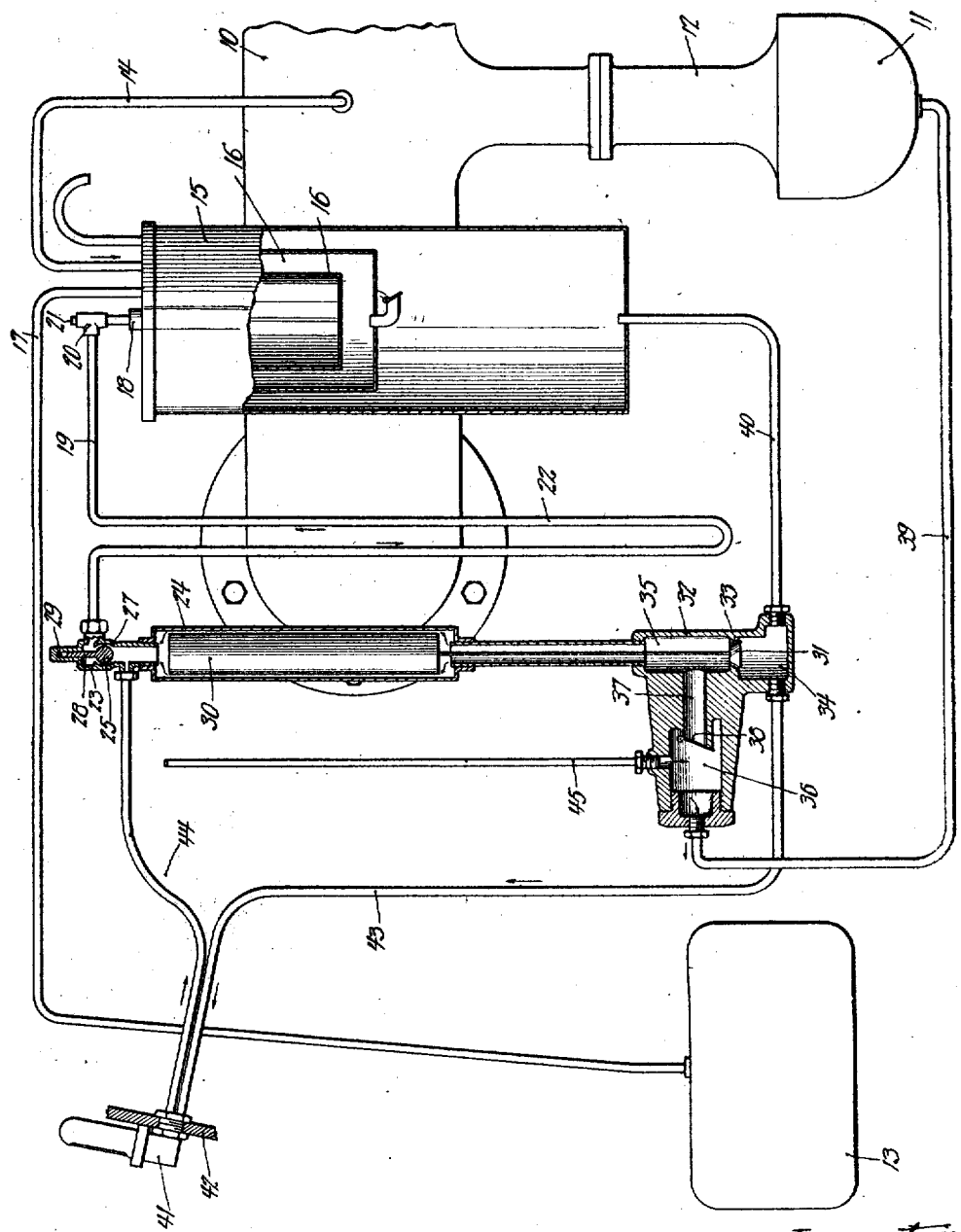
Inventor
Rudolph W. Schroeder
By: Nissen & Crane Attys Patented Jan. 15, 1924.

1,480,784

UNITED STATES PATENT OFFICE.

RUDOLPH W. SCHROEDER, OF CHICAGO, ILLINOIS.

AUTOMATIC BY-PASS AND PRIMER FOR FLOW METERS.

Application filed July 2, 1921. Serial No. 482,275.

*To all whom it may concern:*

Be it known that I, RUDOLPH W. SCHROEDER, a citizen of the United States, residing at Chicago, in the county of Cook and State of Illinois, have invented a certain new and useful Automatic By-Pass and Primer for Flow Meters, of which the following is a specification.

This invention relates to the installation of flow meters for measuring the flow of fuel to combustion engines, and especially to engines for motor conveyances.

The invention has for its object the provision of an installation of the class named which shall be of improved construction and operation and of greater convenience and certainty in use.

The invention is exemplified in the combination and arrangement of parts shown in the accompanying drawing and described in the following specification, and it is more particularly pointed out in the appended claims.

In the drawing, the figure represents somewhat diagrammatically an installation of a flow meter as applied to an automobile and embodying one form of the present invention.

The numeral 10 designates the intake manifold of the engine to which the attachment is applied. 11 represents a carbureter for the engine which may be of any approved construction and is connected with the intake manifold by a conduit 12. A storage tank 13 is provided for the fuel from which the fuel is fed to the carbureter 11 through a vacuum tank 15 of well-known construction. The vacuum tank 15 is connected with the intake manifold 10 by a pipe 14 by means of which the vacuum tank is periodically submitted to the vacuum of the intake manifold to draw liquid from the tank 13 into the vacuum tank. The operation of the vacuum tank is controlled by a float 16 which controls the valves of the tank in a well-known manner and periodically draws liquid from the tank 13 whenever the level in the vacuum tank reaches a predetermined point. The tank 13 is connected to the vacuum tank by a pipe 17. The construction thus far described is the usual and well-known vacuum feed system.

In systems of this kind the tank 15 is usually supplied with an additional inlet at the top which is commonly closed with a plug and through which access may be had to the tank whenever desired. This connection is shown at 18, and in the present invention a pipe 19 leads through a T-fitting 20 to the connection 18, the open portion of the T being closed by a plug 21 so that the pipe 19 will not interfere with access to the vacuum tank. The pipe 19 is provided with a U-trap 22 and is connected through a fitting 23 to a float chamber 24. A valve 25 is arranged in the fitting 23 and is provided with upper and lower seats 26 and 27, respectively. A stem 28 is connected to the valve 25 and operates in a dashpot 29 to control the movement of the valve 25. A float 30 is arranged within the chamber 24 and is connected at its lower end to a valve 31 in a fitting 32. When the chamber 24 is filled with liquid the float 30 will lift the valve 31 against its seat 33 closing the opening between chambers 34 and 35 in the fitting 32. The fitting 32 is provided with a third chamber 36 connected with the chamber 35 by a passage 37 having a flap valve 38 for preventing flow of liquid through the passage from chamber 36 to chamber 35, but permitting free flow in the opposite direction. A pipe 39 leads from the chamber 36 to the carbureter 11 and a pipe 40 connects the lower portion of the vacuum tank 15 with the chamber 34. A flow meter 41 is mounted on the dashboard of the car 42, the flow meter being of any approved construction, such as that shown in my prior application, Serial No. 445,503, filed February 16, 1921.

The intake pipe 43 for the flow meter 41 is connected with the chamber 34 and the discharge pipe 44 is connected with the passage leading from the upper end of the float chamber 24 to the valve fitting 23. A reservoir or standpipe 45 is connected with the chamber 36 in the fitting 32 for holding a reserve supply of fuel for a purpose which will be apparent later. The upper end of the standpipe is vented to atmosphere.

In most vehicles it is necessary to have the flow meter located above the normal fluid level in the vacuum tank 15 in order that the flow meter may be visible to the driver, it being usual to mount the flow meter on the dashboard adjacent the other instruments for indicating the operation of the various mechanisms. The flow of the fluid through the flow meter is due to a siphoning operation, the flow meter being ordinarily at the top of the siphon. If anything should affect the operation of the siphon the supply of fluid to the engine would be cut off unless provision is made for a bypass for fluid under such conditions.

In the operation of the present invention, if for any reason the siphon is broken the bypass for fuel to the engine is automatically opened and the operation of the engine continues as though nothing had happened to the siphon connection with the flow meter. The breaking of the siphon may be caused by broken glass in the flow meter or a loose joint, or any opening which will permit air to enter the siphon passage. As soon as such difficulty is remedied the siphon is automatically restored by the present invention and the flow of fluid through the flow meter is restored without any further attention on the part of the operator. The operation also automatically withdraws bubbles of gas which tend to accumulate in the siphon line.

In normal operation the float chamber 24 is filled with liquid and the valve 31 is held closed. Fuel from the lower portion of the tank 15 flows by gravity through the pipe 40 and chamber 34 to the pipe 43 leading to the flow meter. The fluid flows by a siphoning operation through the flow meter 41 and return pipe 44 to the fitting 23 and down through the float chamber 24 to the chamber 35. It passes from the chamber 35 through the passage 37 and valve 38 to the pipe 39 which leads to the carbureter 11. While the fluid is flowing in this way to the engine the vacuum tank 15 is opened to atmosphere and the valve 26 rests on its lower seat 27. The U-tube 22 is filled with fluid to provide a seal against the passage of air from the upper portion of the vacuum tank 15 to the float chamber 24. The valve 25 also closes the passage to the float chamber 24, but in case of any failure of the valve to properly seat, the U-tube 22 forms a trap for insuring the closure of the passage to atmosphere through the vacuum tank. When the level of the liquid in the vacuum tank 15 is lowered to a predetermined point the float 16 operates a valve for closing the tank to atmosphere and opens a connection through the pipe 14 to the intake manifold. This produces a vacuum in the inner chamber 46 of the vacuum tank 15 and draws fluid from the storage tank 13 through the pipe 17 to the inner chamber of the tank in the well-known manner of operation of vacuum feed systems.

Since the pipe 19 is also connected with the inner chamber 46 of the tank 15 this pipe will also be subjected to the vacuum of the manifold and the suction in the pipe 19 will raise the valve 25 from its seat 27 and move it slowly against the upper seat 26, the movement being controlled by the dashpot 29. This operation will draw fluid for a short period of time from the fitting 23 to the vacuum tank 15. This fluid cannot come from the float chamber 24 since the passages of this chamber are closed by the valve 31 and the flap valve 38. The fluid must therefore flow through the pipe 44 and the flow meter 41 and is supplied to the flow meter 41 from the lower portion of the vacuum tank 15 through the pipes 40 and 43 and the chamber 34. This flow of fluid through the flow meter due to the fact that the discharge pipe from the flow meter is connected with the intake vacuum draws any gas or air from the flow meter siphon and thus restores the siphon in case it has been broken by an accumulation of air or gas in the flow meter or siphon pipes.

Since the vacuum tank 15 charges periodically it will be seen that the flow meter is thus periodically subjected to the suction of the intake manifold which draws any accumulated gas or air from the flow meter system and at the same time causes an excessive rush of fluid through the flow meter, assisting in completely clearing the flow meter of any gas. This rush of fluid will cause a momentary rising of the indicator in the flow meter which will last from one to three or four seconds, the period of time depending on the operation of the valve 25 controlled by the dashpot 29. As soon as the valve 25 is closed against the seat 26 the flow of fluid through the pipe 19 from the flow meter will be shut off and all of the fluid drawn into the vacuum tank will come from the storage tank 13 through the pipe 17 during the remaining portion of the charging operation of the vacuum tank. The major portion of the fluid drawn into the tank 15 will come from the storage tank 13. but a minor amount passes from the lower portion of the tank through the flow meter pipes. The time of such passage is very limited, however, and may be controlled by the operation of the dashpot, and the quantity may be restricted to a small amount by the limited bore of the pipe 19. The small amount of liquid bypassed from the lower end of the tank during the priming operation therefore in no way interferes with the filling of the tank 15. The valve 38 prevents any tendency to draw fluid from the carbureter during such priming operation.

During the time that the valve 38 is closed it will be seen that fluid cannot flow to the carburetor through the usual passage, and if the engine is running at a high rate of speed this momentary cutting off of the supply of fluid might slightly interfere with the operation of the engine. To prevent this the storage pipe 45 is connected with the chamber 36 and sufficient fuel is supplied from this storage pipe during the priming operation to prevent any interference with the operation of the engine. The period of priming is controlled by the valve 25 and dashpot 29 so that ordinarily the priming operation will continue for a short portion only of the charging period of the vacuum tank.

If the valve 25 were omitted the device would operate under ordinary conditions in a satisfactory manner, but in case the engine were running with a wide-open throttle the vacuum in the intake manifold 10 might in some cases not be sufficient to properly charge the tank 15 if the passage through the flow meter were kept open during the entire charging operation. As soon as the valve is closed, however, the entire effect of the vacuum in the manifold is exerted to draw fuel from the storage tank. Limiting the priming period also somewhat increases the amount of fuel charged into the tank at each priming operation by decreasing the amount fed from the bottom of the tank to the flow meter. This feature, however, is of minor importance since the amount of fluid thus bypassed is not sufficient to materially affect the operation of the vacuum system, even in the absence of the valve 25.

In case of any accident to the flow meter siphon which admits atmospheric pressure to the siphon the height of the fluid in the pipe 43 and float chamber 24 will, of course, drop to the level of the fluid in the tank 15. This will break the siphon, and if it were not for the bypass valve, would cut off the supply of fuel to the carbureter. As soon, however, as the surface level of the fluid in the float chamber 24 is lowered the valve 31 will be opened and fuel will then flow directly from the tank 15 through the pipe 40 past the valve 31 and through the passage 37 and chamber 36 to the pipe 39, and thence to the carbureter.

In practice it is found that the siphon in the flow meter may be broken by removing the glass or unscrewing the case, or any other expedient, and that the operation of the engine will be in no way affected. After the opening in the siphon is closed the siphon will be automatically primed at the next charging operation of the vacuum tank and the operation of the instrument will be resumed. The advantage of this automatic bypass and automatic priming of the flow meter is readily apparent since it automatically prevents any injury to the instrument from affecting the operation of the engine, which in the case of the ordinary driver who would not understand the mechanism to sufficiently remedy the difficulty, might otherwise be a serious matter. With the present invention an accident to the flow meter instrument merely interferes with the operation of the instrument itself and no other part of the machine, and the operation of the instrument is automatically restored as soon as the difficulty is repaired.

I claim:—

1. The combination with a liquid fuel engine having an intake manifold, of a flow meter for measuring the flow of fluid to said engine, a conduit for connecting said flow meter to said engine, and means comprising a different conduit for periodically subjecting said flow meter to manifold vacuum.

2. The combination with an internal combustion engine having an intake manifold and a vacuum fuel supply tank periodically connected with said manifold, of a flow meter for measuring the flow of fluid to said engine, means for subjecting said flow meter to the periodic vacuum of said supply tank and means for limiting the time that the flow meter is subjected to said vacuum to a period less than the vacuum period of said tank.

3. The combination with a flow meter, of a gravity acting siphon for feeding fluid through said flow meter and separate means for periodically subjecting said flow meter for limited periods of time to a suction operation to remove gaseous material from said flow meter.

4. The combination with a flow meter, of means for siphoning liquid to said flow meter, and means for subjecting said flow meter to a suction operation to remove gaseous material therefrom.

5. The comination with a liquid consuming engine, of a flow meter for measuring the flow of liquid to said engine, a siphon for supplying liquid to said flow meter, and means operated periodically by said engine for subjecting said flow meter to a suction operation to remove gaseous material therefrom.

6. The combination with a flow meter, of a siphon for supplying liquid to said flow meter, and means for automatically removing gaseous material from said siphon to start the operation thereof whenever the accumulation of gas in said siphon occurs.

7. The combination with a flow meter, of a siphon for supplying liquid to said flow meter, and means for automatically restoring the operation of said siphon when the passage of said siphon is closed to atmosphere after a break therein.

8. The combination with a liquid consuming engine, of a flow meter for measuring the flow of fluid to said engine, a siphon for supplying said fluid to said flow meter, and means operated by said engine for subjecting said siphon to a suction operation to automatically restore said siphon when the passage of said siphon is closed to atmosphere after a break therein.

9. The combination with a liquid fuel engine of a flow meter for measuring the flow of fluid to said engine, a siphon in which said flow of meter is connected, and means for periodically subjecting said siphon to the vacuum created by said engine to remove gaseous materials which may have collected in said siphon.

10. The combination with a liquid fuel burning engine having an intake manifold, of a flow meter for indicating the flow of fuel to said engine, a siphon in which said flow meter is connected, and means for periodically subjecting said siphon to the vacuum of said intake manifold for a limited period of time to remove gaseous material which may have collected in said siphon and to automatically prime said siphon in case its operation has been interfered with by the collection of such gaseous materia..

11. The combination with a liquid fuel burning engine having an intake manifold, of a flow meter for measuring the flow of fuel to said engine and located above the normal surface level of the fuel supply to said engine, a siphon for conducting fuel to said flow meter, and automatic means for periodically subjecting said siphon to the vacuum of said intake manifold to remove gaseous material which may have collected in said siphon and to automatically prime said siphon.

12. The combination with a liquid fuel burning engine, of a vacuum tank for supplying fuel to said engine to which tank fuel is periodically charged by suction from the intake manifold of said engine, a flow meter located above the surface level of the fuel in said tank, a siphon for conducting fuel from said tank through said flow meter to said engine, and a connection between said siphon and the upper portion of said tank to subject said siphon to the periodic vacuum created in said tank.

13. The combination with an internal combustion engine having a fuel supply tank therefor alternately subjected to atmospheric and intake manifold pressure, of a flow meter for measuring the flow of fuel from said tank to said engine, a discharge conduit for said flow meter communicating with said engine, and a connection other than said discharge conduit between the upper portion of said tank and said flow meter.

14. The combination with an internal combustion engine having a tank for supplying fuel therefor which is alternately subjected to atmospheric and intake manifold pressure, of a flow meter for measuring the flow of fluid from said tank to said engine, said flow meter being located above the surface level of the fluid in said tank and having a siphon for conducting fluid thereto, and a connection between the upper portion of said tank and said siphon to periodically subject said siphon to the suction of said tank when subjected to manifold pressure.

15. The combination with an internal combustion engine having a vacuum tank for supplying fuel thereto which is alternately subjected to atmospheric and intake manifold pressure, of a flow meter for measuring the flow of fluid from the lower portion of said tank to said engine, said flow meter being positioned above the level of the fluid in said tank and connected in a siphon for conducting fluid from said tank to said engine, a connection between said siphon and the upper portion of said tank, and means for preventing the flow of air from said tank to said siphon.

16. The combination with an internal combustion engine having a vacuum tank for supplying fuel thereto, of a flow meter for indicating the rate of flow of fuel from said tank to said engine, a connection between the upper portion of said tank and said flow meter, and a trap in said connection to prevent the flow of air from said tank to said flow meter.

17. The combination with an internal combustion engine, of a tank for supplying fuel to said engine, said tank being periodically subjected to the vacuum of the intake manifold of said engine to draw fuel into said tank, a flow meter for indicating the rate of flow of fluid from said tank to said engine, a connection between said flow meter and the upper portion of said tank for submitting said flow meter to the periodic vacuum in said tank, and a valve for preventing flow of air from said tank to said flow meter.

18. The combination with an internal combustion engine, of a tank for supplying fuel thereto periodically submitted to intake manifold vacuum, a siphon having a flow meter therein and connecting the lower portion of said tank with said engine, means for connecting the upper portion of said tank with said siphon, a valve interposed in said connecting means for preventing return flow of air from said tank to said siphon, and a U-tube forming a trap in said connecting means for supplementing the action of said valve.

19. The combination with an internal combustion engine having a vacuum supply tank for furnishing fuel thereto, of a siphon for connecting said tank with said engine, a flow meter positioned in said siphon, means for connecting said siphon with the upper portion of said tank to submit said siphon to periodic vacuum in said tank, a valve for closing the connection between said siphon and the upper portion of said tank arranged to be closed by the flow of fluid from said siphon to said tank, and a dashpot for preventing instantaneous closing of said valve.

20. The combination with an internal combustion engine, of a flow meter for indicating the rate of flow of fluid to said engine having a connection with said engine, means for subjecting said flow meter to a suction operation, and a valve for closing the connection between said flow meter and said engine to prevent said suction operation from affecting the connection with said engine.

21. The combination with an internal combustion engine having an intake manifold, of a flow meter for indicating the rate of flow of fluid to said engine, conduits connecting said flow meter with said engine, and a source of fluid supply, means for periodically subjecting said flow meter to a suction operation, and a one-way valve for closing the connection between said flow meter and said engine during said suction operation.

22. The combination with an internal combustion engine, of a flow meter for indicating the rate of flow of fuel to said engine, conduits leading from a source of fuel supply through said flow meter to said engine, means for periodically subjecting said flow meter to the manifold vacuum of said engine, and a one-way valve for preventing reverse flow of fluid in said conduits during the operation of the manifold vacuum on said flow meter.

23. The combination with an internal combustion engine having an intake manifold, of a tank for supplying fuel to said engine, a siphon connecting said tank with said engine, a flow meter located in said siphon, a connection between said intake manifold and said siphon for periodically subjecting said siphon to the intake manifold vacuum of said engine, and a one-way valve interposed between said connection and said engine to prevent the operation of said vacuum on said engine.

24. The combination with an internal combustion engine having an intake manifold, of a tank for supplying fuel to said engine, conduits for connecting said tank with said engine, a flow meter interposed between said conduits, means for periodically subjecting said flow meter to the vacuum of said intake manifold, a valve for automatically closing the conduit from said flow meter to said engine during the periodic operation of said vacuum on said flow meter, and a storage reservoir for supplying fuel to said engine while said valve is closed.

25. The combination with an internal combustion engine, of a conduit for supplying fuel to said engine, a flow meter connected with said conduit for indicating the rate of flow of fuel to said engine, periodically operating means for preventing flow of fuel through said flow meter to said engine, and a storage reservoir for supplying fuel to said engine during the period of operation of said last-named means.

26. The combination with an internal combustion engine, of a siphon for supplying fuel to said engine, and an automatically operable bypass for supplying fuel to said engine in case said siphon fails to function.

27. The combination with an internal combustion engine, of means for supplying fuel to said engine including a siphon, a bypass to admit fuel to said engine without passing through said siphon, means for normally closing said bypass, and means for automatically opening said bypass in case said siphon fails to operate.

28. The combination with an internal combustion engine, of a tank for supplying fuel to said engine, a flow meter for indicating the rate of flow of fuel from said tank to said engine, said flow meter being located above the surface level of the fuel in said tank, a siphon for conducting fuel through said flow meter, a bypass from said tank to said engine located below the surface level of fuel in said tank, means normally closing said bypass, and means for automatically opening said bypass in case said siphon is broken.

29. The combination with an internal combustion engine, of a tank for supplying fuel to said engine, a flow meter for indicating the rate of flow of fuel from said tank to said engine, a siphon for conducting fuel to and from said flow meter, a bypass for conducting fuel from said tank to said engine without passing through said flow meter, a valve for closing said bypass, and a float arranged in a portion of said siphon for normally holding said valve closed when said siphon is operated.

30. The combination with an internal combustion engine, of a flow meter for indicating the rate of flow of fuel to said engine, a siphon for conducting fuel to and from said flow meter, a bypass for conducting fuel to said engine without passing through said flow meter, means for closing said bypass and for automatically opening said bypass in case said siphon is broken, and automatic priming mechanism for removing gas from said siphon to start the operation thereof.

31. The combination with a liquid fuel burning engine, of a tank for supplying fuel to said engine, a siphon for conducting fuel from said tank to said engine, a flow meter connected in said siphon, priming mechanism for automatically removing gas from said siphon to start the operation thereof, and automatic means for bypassing liquid from said tank to said engine in case said siphon is broken.

32. The combination with an internal combustion engine having an intake manifold, of a tank for supplying fuel to said engine, a conduit in the form of a siphon for conducting fuel from said tank to said engine, means for periodically subjecting said siphon to a suction operation to automatically prime said siphon, and means for automatically bypassing fuel past said siphon from said tank to said engine in case said siphon is broken.

33. The combination with an internal combustion engine, of a vacuum tank for supplying fuel to said engine, said vacuum tank being connected with the intake manifold of said engine and periodically subject it to the vacuum thereof, a conduit in the form of a siphon connecting said tank to said engine, a flow meter in said conduit, a connection between said conduit and said tank for subjecting said conduit to the periodic vacuum in said tank to automatically prime said siphon, a bypass to permit fluid to flow from said tank to said engine without passing through said siphon, a valve for closing said bypass, and a float controlled by the fluid in said siphon for closing said valve when said siphon is operating but arranged to automatically open said valve and bypass when said siphon is broken.

34. The combination with an internal combustion engine, of a periodically acting vacuum tank for supplying fuel to said engine, a flow meter for indicating the rate of flow of fuel from said tank to said engine and located above the surface level of the fuel in said tank, a conduit forming a siphon connecting said flow meter with said tank, and engine, a connection between said tank and said siphon for periodically subjecting said siphon to the vacuum in said tank for automatically priming said siphon, a bypass for automatically connecting said tank and engine independently of said siphon when said siphon is broken, a valve for preventing reverse flow of fluid through said siphon when said siphon is subjected to the suction of said tank, and a reservoir for supplying fuel for said engine when said valve is closed.

35. In a flowmeter system for explosive engines the combination of a supply receptacle; a carburetor; a flowmeter above the receptacle; a connection between the receptacle and the flowmeter; a connection between the flowmeter and carburetor; a bypass leading from the receptacle; and controlling means adapted to establish either a connection between the receptacle and the carburetor by way of the bypass, or a connection between the receptacle and the carburetor by way of the flowmeter.

In testimony whereof I have signed my name to this specification on this 22d day of June, A. D. 1921.

RUDOLPH W. SCHROEDER.